United States Patent [19]

Hong

[11] Patent Number: 5,268,959
[45] Date of Patent: Dec. 7, 1993

[54] TELEPHONE LONG DISTANCE REDIALING APPARATUS AND PROCESS

[76] Inventor: Inpon D. Hong, 2535 Medina Cir., Bellevue, Wash. 98004

[21] Appl. No.: 542,451

[22] Filed: Jun. 22, 1990

[51] Int. Cl.⁵ .............................................. H04M 1/00
[52] U.S. Cl. .................................. 379/356; 379/354; 379/355; 379/216
[58] Field of Search ............... 379/354, 355, 356, 216

[56] References Cited

U.S. PATENT DOCUMENTS

| | | |
|---|---|---|
| 3,804,984 | 4/1974 | Yachabach . |
| 3,920,926 | 11/1975 | Lenaerts et al. . |
| 3,932,709 | 1/1976 | Hoff et al. . |
| 4,008,379 | 2/1977 | Watkins . |
| 4,008,380 | 2/1977 | La Borde . |
| 4,029,908 | 6/1977 | Moseley et al. . |
| 4,032,722 | 6/1977 | Connolly et al. . |
| 4,119,810 | 10/1978 | Marin et al. . |
| 4,243,845 | 1/1981 | Feinberg et al. . |
| 4,324,954 | 4/1982 | Taylor . |
| 4,431,870 | 2/1984 | May et al. ............................ 379/354 |
| 4,864,622 | 9/1989 | Iida et al. ............................ 379/355 |
| 4,870,686 | 9/1989 | Gerson et al. ....................... 379/355 |
| 4,980,910 | 12/1990 | Osa et al. ............................. 379/355 |

*Primary Examiner*—James L. Dwyer
*Assistant Examiner*—Jhancy Augustus

[57] ABSTRACT

To enable a long distance prefix "1" to be added to the memory in a telephone set of the last number dialed, a permanent memory of "1" is provided which enables the prefix "1" to be dialed automatically prior to and in conjunction with automatic redialing of the last number dialed by pressing a single long distance redial key.

4 Claims, 3 Drawing Sheets

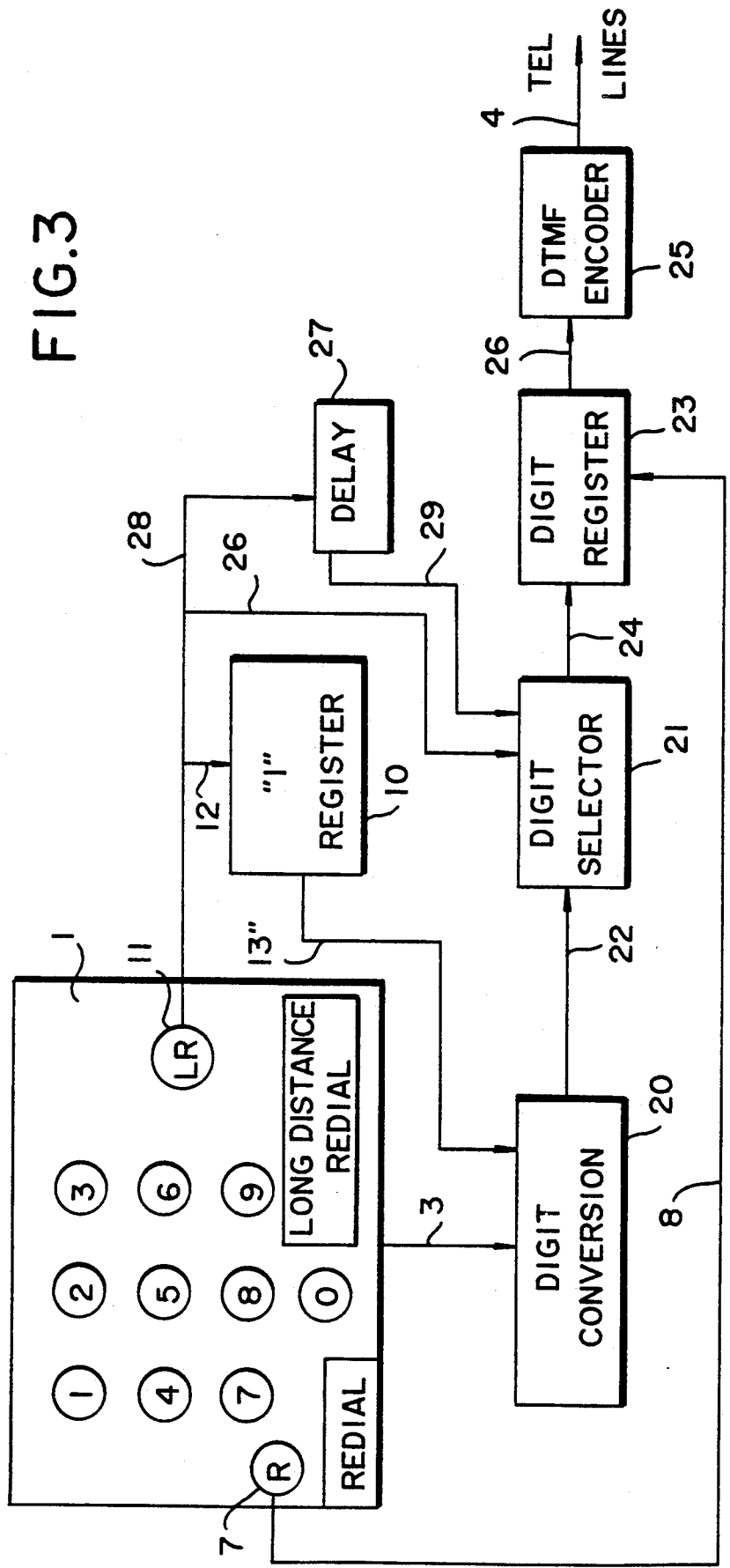

TELEPHONE LONG DISTANCE REDIALING APPARATUS AND PROCESS

BACKGROUND OF THE INVENTION

1. Field of the Invention

This invention relates to automatic redialing systems for telephones and particularly to a system for automatically inserting the universal long distance prefix in the form of the numeral "1" before a last number dialed memory recorded number.

2. Prior Art

Examples of U.S. patents that relate to the general field of telephone apparatus using microprocessor electronic circuitry are U.S. Pat. No. 3,804,984, issued Apr. 16, 1974 (Yachabach);
U.S. Pat. No. 4,008,379, issued Feb. 15, 1977 (Watkins);
U.S. Pat. No. 4,032,722, issued Jun. 28, 1977 (Connolly et al.);
U.S. Pat. No. 4,119,810, issued Oct. 10, 1978 (Marin et al.).

The following U.S. patents disclose microprocessor electronic telephone circuits that provide for storing the last number dialed in a memory and redialing that number by activation of the memory:

U.S. Pat. No. 3,920,926, issued Nov. 18, 1975 (Lenaerts et al.);
U.S. Pat. No. 3,932,709, issued Jan. 13, 1976 (Hoff et al.);
U.S. Pat. No. 4,008,380, issued Feb. 15, 1977 (La Borde);
U.S. Pat. No. 4,029,908, issued Jun. 14, 1977 (Moseley et al.);
U.S. Pat. No. 4,119,810, issued Oct. 10, 1978 (Marin et al.);
U.S. Pat. No. 4,243,845, issued Jan. 6, 1981 (Feinberg et al.);
U.S. Pat. No. 4,324,954, issued Apr. 13, 1982 (Taylor).

These patents did not specifically confront the problem solved by applicant or at least did not provide as simple and practical a solution.

Problem

A specific problem addressed by the present invention occurs when a long distance telephone number is dialed without the prefix "1" resulting in the telephone user receiving a recording such as We are sorry, you must first dial a "1" when calling this number. Will you please hang up and try again.

Even though the telephone number is in a last number dialed memory, the entire number must again be dialed manually following the dialing of the prefix "1".

SUMMARY OF THE INVENTION

It is a principal object of the present invention to provide apparatus and a process to simplify dialing of a long distance telephone number within the user's area code when such number was previously dialed without the universal prefix "1".

A more specific object is to enable such long distance telephone number to be dialed by pressing a single key of a telephone key pad.

The foregoing objects can be accomplished by providing apparatus and a process for storing a "1" code in a permanent storage of a microprocessor electronic telephone circuit and reading out such code followed by automatically reading out the contents of a last number dialed memory simply by pressing a single long distance redial button on the telephone set.

BRIEF DESCRIPTION OF THE DRAWINGS

FIG. 3 is a somewhat more detailed block diagram of a further electronic telephone circuit for accomplishing the present invention.

DETAILED DESCRIPTION

Telephone Dialing Apparatus

Figure 1:
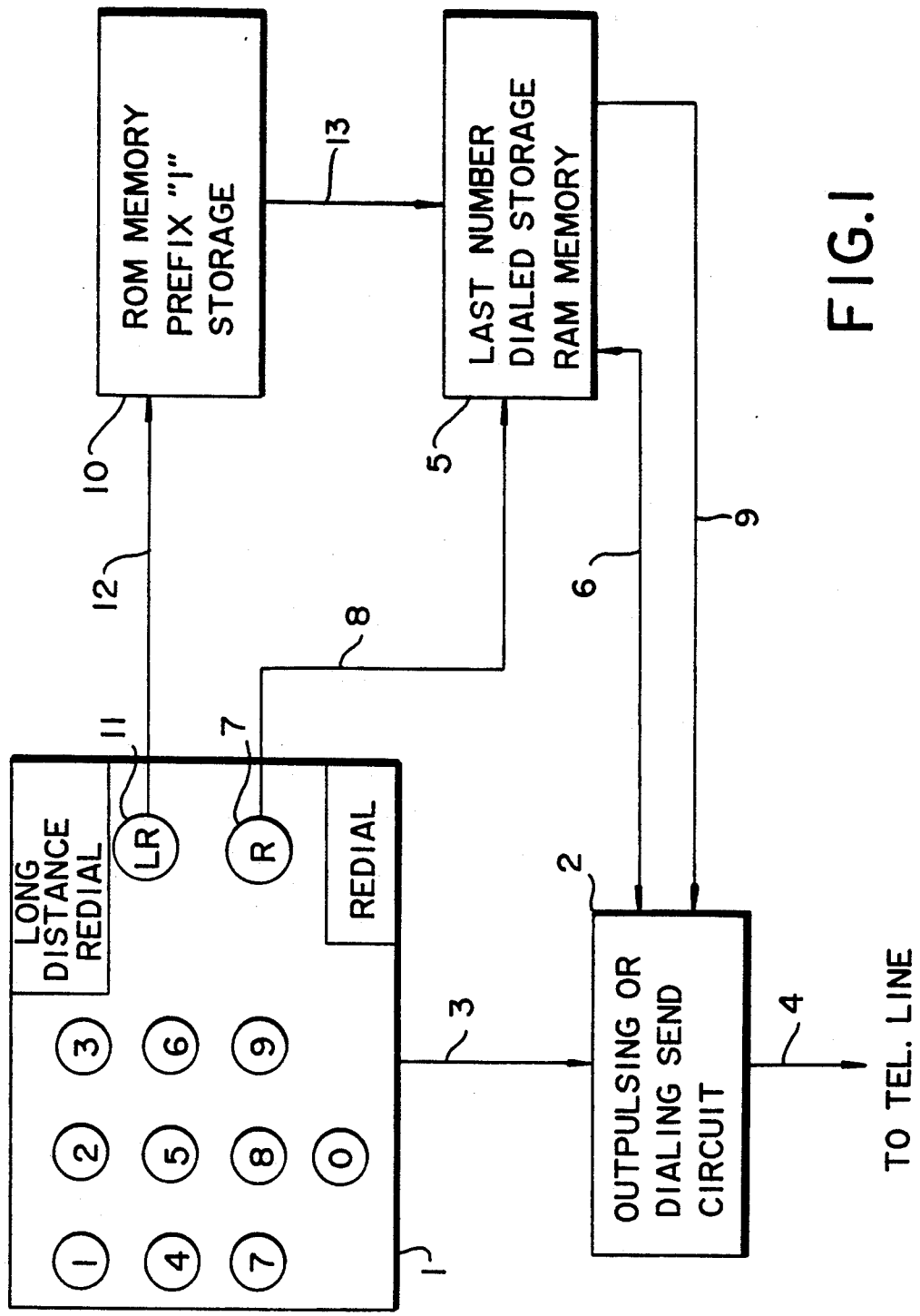
FIG. 1 is a block circuit diagram of an electronic telephone circuit for accomplishing the present invention.

As shown diagrammatically in FIG. 1, the apparatus of the present invention includes a conventional ten-digit keypad 1 which is connected to an outpulsing or dialing send circuit 2 by a connection 3 and such send circuit is in turn connected to a telephone line 4. The electronic circuitry for such dialing transmission is well known and while either a rotary dial or a push-button keypad could be used the latter is preferable. With respect to such a telephone, the statement in U.S. Pat. No. 4,243,845 at column 2, lines 50 to 55, is applicable, namely:

This is a conventional dialing mode which enables a user to employ the conventional keyboard (keys 0 to 9) to dial in telephone numbers as would be accomplished in an ordinary telephone. This operation is referred to as normal or manual dialing and is accomplished in exactly the same manner as in present telephony apparatus.

A more detailed description of a conventional dialing mechanism and its operation is given in U.S. Pat. No. 4,324,954 from column 3, line 10, to column 5, line 20, and this description is incorporated in the present application by reference.

Figure 2:
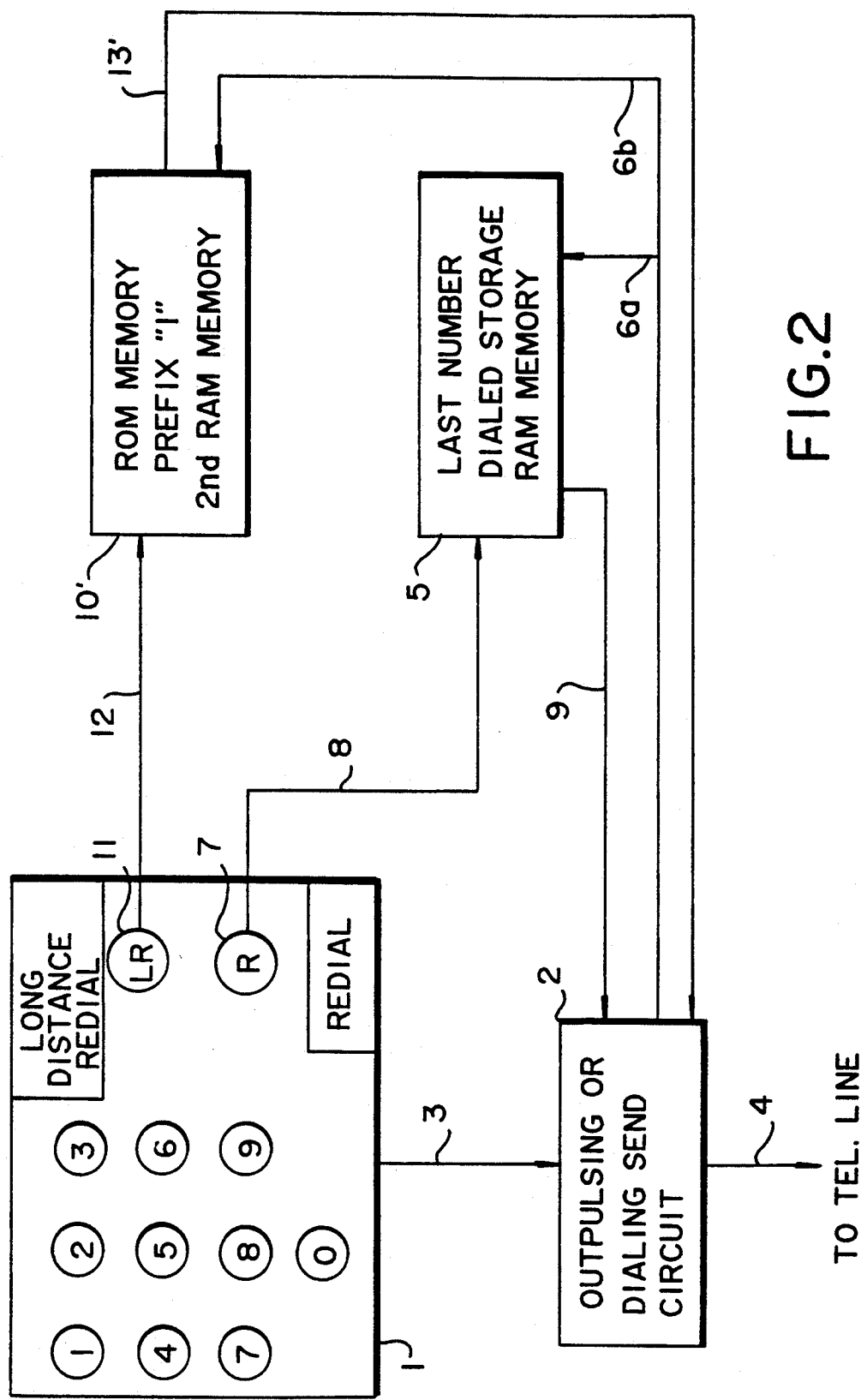
FIG. 2 is a block circuit diagram showing a modification of the circuit of FIG. 1.

Components corresponding to the component 2 designated "outpulsing or dialing send circuit" have been designated by different terms in different prior patents. FIG. 2 of U.S. Pat. No. 3,932,709 shows in FIG. 2 a dialer (outpulser) 62 which is referred to at column 7, line 33.

Item 210 in FIG. 7 of U.S. Pat. No. 4,029,908 is designated as the outpulsing circuit, and such circuit is referred to at column 6, lines 43 to 46.

U.S. Pat. No. 4,008,380 shows in FIG. 1 a dialer unit 23 connected to a pulsing circuit 29 which components are discussed at column 3, lines 40 to 47, and 51 to 60.

The earlier U.S. Pat. No. 3,920,926 designates component 7 in FIG. 1 as a "send circuit" which is described in column 3, lines 10 to 19.

The later U.S. Pat. No. 4,324,954 refers to the output of the instrument simply as "dialing circuits" discussed from column 4, line 10, to column 5, line 20.

Redial Function

Particularly with ten-key keypad telephone sets, a "redial" operation is frequently provided which incorporates a last number dialed temporary storage memory (RAM—Random Access Memory) 5. The last number dialed is written to memory 5 through a connection 6 from the outpulsing or dialing send circuit. A redial button 7 is connected to the memory 5 by a connection 8. Pressing the redial button actuates the memory to read the last number dialed to the outpulsing or dialing send circuit 2 for transmission to the telephone line. When the receiving telephone corresponding to the last number dialed is busy or is not answered, the last number dialed can be transmitted again simply by pressing the redial button 7 instead of using the keys of the keypad 1 to dial the number manually.

Provision for such an automatic redial operation is not new. Apparatus for effecting such an operation is shown in the various prior patents listed above.

The redial operation of U.S. Pat. No. 3,932,709 is described at column 5, beginning at line 30.

> The memory section of the processor module provides the function of temporary storage of keyboard entered information for recall upon operator command when desired. The memory recall operation transfers the contents of the memory section into the display buffer and display panel overwriting their previous contents. This operation may be used for example in telephone mode in connection with the automatic redial function. In this instance assuming the operator has entered a telephone number into the display buffer and attempted call placement but has found the line busy he can press the PM (phone memory) button on the keyboard and store the busy number in memory. At a later time the operator merely presses the RM (recall memory) button on the keyboard and the previously entered number is transferred to the display buffer and visually presented on the display panel for pre-dial verification. The operator may either visually re-verify the number and then press DIAL to automatically place the call, or, if the re-verification is not needed, he may merely press RM and DIAL in rapid succession thereby immediately initiating automatic call placement.

U.S. Pat. No. 4,008,380 describes its redial mechanism and operation as follows beginning at column 7, line 15:

> A re-dial function is provided in situations where during the dialing of a number or immediately thereafter it is not desired to complete the telephone connection. The asterisk key (*) is depressed before the handset is returned to the phone unit. This prevents the resetting of the dialer since the output of the asterisk key (*) is coupled to the dialer unit which in turn generates an inhibit pulse to AND gate 95 which prevents a reset signal from being coupled to the dialer when the handset is returned to the telephone unit. Then upon lifting of the handset from the telephone to thereby close the hook switch, the number in the dialer is converted to a serial pulse train corresponding to the number coupled to the dialer after the asterisk key (*) is again depressed.

The description continues at column 8, beginning at line 43:

> if a number is being dialed and a busy signal is received or if the dialer otherwise does not wish to talk to the party called, the asterisk key (*) is depressed before returning the handset to the phone unit 15. When this occurs a signal is coupled to the dialer 23 for setting a flip-flop therein which in turn provides an inhibit signal to the NAND gate 95. This signal prevents the dialer from being reset when the hook switch 45 is opened when the handset receiver is repositioned on the phone. At the same time the output of the keyboard unit due to the depression of the asterisk key is coupled to the NAND gate 33 to thereby enable a tone signal from oscillator 31 to be coupled to the telephone unit 15 to indicate to the operator that a key has been depressed.
>
> Subsequently, when the handset is again removed from the telephone and the hook switch 45 closed, if the asterisk key is depressed the flip-flop within the dialer unit 23 is switched to its other state to thereby permit the dialed number to be converted to a pulse train dependent upon the number dialed. The pulse train is coupled on output line 117 to NAND gate 119.

In U.S. Pat. No. 4,029,908, reference is made to redialing at column 7, beginning at line 53:

> In the event that a call is not completed, the call can be redialed by again actuating the redial button.

Further explanation is given beginning at column 12, line 62:

> The data must be reordered in order for proper redialing or recording of the stored telephone number to correctly be accomplished. Upon commencement of a redialing or recording mode, control logic 326 provides an appropriate command to the shift register to cause recirculation of data from stage 24 to stage 1 and corresponding shifting to data from stage 1 to stage 24 until an X marker is present in stage 24.

The redial mechanism of U.S. Pat. No. 4,119,810 is described as follows beginning at column 4, line 52:

> In accordance with an important aspect of the present invention, the binary to dial pulse converter stage 48 includes a memory stage into which the last number that was entered is stored until the next digit entry is accomplished. To this end, a redial control circuit 82 is provided with the * keypad input 42 providing a control signal to the redial control circuit 82 which is effective to cause the binary to dial pulse converter 48 to outpulse the number stored in the memory, the last number called. A call request circuit 84 is provided to clear the binary to dial pulse converter stage 48 to accept new digiti inputs or to redial. The output of the call request circuit 84 is also connected to drive redial circuit 82. A hold circuit 86 is provided under the control of a function keypad to disable the outpulsing at line 64 of the binary to dial pulse converter stage 48 at the completion of the digit being outpulsed. The hold is removed and outpulsing continues when the keypad is released.

The description continues at column 5, beginning at line 34:

> Automatic redialing of the last dial pulse number entered into the stage 48 is selectively enabled by actuation of the * keypad. When apparatus is placed in an on-hook condition, the signalling mode selection circuit 50 is reset to the dial pulse mode. After the # keypad has been actuated to provide tone signalling for keyed in digits, depression of the * keypad enables the automatic redial and output signalling of the last number stored in the memory 90.

The electronic telephone set 10 shown in FIG. 1 of U.S. Pat. No. 4,324,954 has an "LND" (last number dialed) key and a random-access memory (RAM) of a microcomputer 40 in which the last number dialed is stored as described from column 5, line 21, to column 6, line 32. This description states in part beginning at column 5, lines 29, > If the number dialed is busy, no answer, or otherwise it is desired to redial the same number within the RAM-retention period, in the example illustrated, the handset is again removed from the cradle to reactivate the network and the microcomputer 40 as described above, and a single last-number dialed button or key, designed "LND" on the dial pad 70, is then depressed. This operates the microcomputer 40 to automatically redial the last number from the RAM, as is generally well known in principle. . . . the microcomputer senses an input signal at ports 71 and 79, which is decoded so as to dial the number stored in the RAM, as is generally well known in the art, to redial the stored number in the same manner previously described.

In connection with LND operation, the general principles of LND redialing controlled by a microcomputer or similar electronic controller unit are well known in the art, typical examples providing further background and examples of circuit details being illustrated in the following U.S. Pat. Nos. (herein incorporated by reference): A Marin et al. 4,119,810; G. V. Lenaerts et al. 3,920,926; and D. G. Hoff et al. 3,932,709.

Redial systems, such as discussed above, are quite satisfactory for use in the situations mentioned, such as where a telephone being called is busy or is not answered or for some other reason the telephone user wishes to reactive a call to the last number dialed without taking the time to use a rotary dial or a keypad to reprogram manually the number desired to be called.

The present invention is addressed to a different specific situation which occurs frequently principally in a metropolitan area. Particularly if a caller has left a number with a telephone receptionist for a return call, the telephone user often does not know whether that call is or is not a long distance call. The user will therefore simply dial the number requested to be called without dialing any long distance "1" prefix.

In many instances, dialing of such a number to be called will result in a recording giving a message such as We are sorry. You must first dial a "1" when calling this number. Will you please hang up and try the number again.

Such telephone number just dialed may be stored in an LND memory, but pressing the redial button will only result in retransmission of the same number without the long distance "1" prefix. It is therefore necessary for the user to dial manually the long distance prefix "1" followed by manual dialing of the number previously dialed even though it is stored in the LND memory without a "1" prefix.

If such number with the prefix "1" is busy or does not answer, such number with the prefix "1" will be stored in the LND memory and can be dialed the next time simply by pressing the redial button. Such automatic transmission of the number to be called is not, however, an operation that is available in the usual redial system when it is necessary to retransmit the number in the LND memory preceded by "1" after receiving a recording such as given above.

The present invention enables a number stored in an LND memory to be used for automatic dialing preceded by the long distance prefix "1" by pressing a single button. This operation is accomplished by providing in the block diagram circuit shown in FIG. 1 a permanent ROM (read only memory) 10 which is connected to a long distance redial button (LR) 11 on the telephone set by a connection 12. The memory is also connected to the LND RAM (random access memory) 5 by the connection 13. Upon receiving a recording that the long distance number "1" must be dialed first, as discussed above, it is merely necessary for the user to press the LR (long distance redial) button 11 which will activate the permanent memory 10 storing the prefix "1" and the LND memory 5 in sequence to cause the outpulsing or dialing send circuit 2 to transmit the long distance "1" followed by the stored last number dialed so that it is not necessary to dial the number sequence manually by depressing of keys on the keypad 1.

The use of a permanent or ROM memory in a telephone set is not new. Use of preset or permanent memories coupled to respective activating keys is not new. Such apparatus is described in U.S. Pat. No. 4,324,954 at column 7, beginning at line 26:

. . . emergency or other widely called numbers, such as "Police," "Fire," or the U.S. standard "911" emergency number, can be permanently stored in ROM (read-only memory) sections of the microcomputer, and automatically dialed by operation of a corresponding single dedicated button of the keyboard, such as "P" (Police) and "F" (Fire) in the example keyboard layout 70 illustrated in FIG. 1. In general, use of a single dedicated button to dial emergency numbers is well known in the art; for example, as described in J. J. Yachabach U.S. Pat. No. 3,804,984 or D. C. A. Connolly et al. U.S. Pat. No. 4,032,722, both herein incorporated by reference.

U.S. Pat. No. 3,804,984 states beginning at column 3, line 57:

The present emergency signalling device comprises an auxiliary non-dialing means which may be considered as an automatic dialer and comprise primary four basic stations which, as illustrated in the drawings, include (1) an oscillator comprising two units forming a relaxation oscillator 11 and a divide-by-2 ($\div 2$) flip-flop A, (2) a pulser which includes a voltage regulator and energy storage unit 12 and a switch unit 13, (3) a counter logic section which includes a mode select and system power latch C, a stop oscillator 14, a flip-flop interdigit enable unit 15, a make-break ratio logic unit 16, an oscillator interdigit delay unit 17, a decade counter B, an emergency manually operable circuit-closing means comprising an operator push button switch 18, and a general purpose operator push button switch 19, and (4) ancillary and protective circuitry comprising a power-off reset unit 20, a power-up reset and delay initiate dialing unit 21, a ground path enable unit 22, and the various electrical interconnections of these units.

U.S. Pat. No. 4,032,722 does not have the usual manually operable dial, but simply has automatically dialing, as stated beginning at column 2, line 40:

The instrument 1 does not have a dial or other device to enable a user to set up a call connection through the exchange and, since it is a standard item, will not be described further herein. The apparatus does however have provision for trains of dial impulses to be supplied to he line wires 2 to characterize one particular party connected to the public network upon manual operation of a push-button 3. The apparatus may therefore only be used to make a call to that one party.

Correspondingly, the LR button of the present invention can access only the ROM permanently storing the long distance number "1" to be transmitted automatically as a prefix to the last number dialed which is stored in the temporary LND memory 5.

FIG. 2 is a block diagram of circuitry for accomplishing the objective as described in connection with FIG.

1 but supplies somewhat greater detail. In this instance, memory 10' is shown as a split or two-section memory, one being a ROM memory in which the prefix "1" is stored and the other being a RAM memory. The outpulsing or dialing send circuit is connected both to the LND RAM memory and to the RAM memory section of memory 10' by connections 6a and 6b, respectively. Consequently, each time a number is dialed and outpulsed by circuit 2, that number will be stored in both the LND memory 5 and in the RAM memory section of memory 10'.

Normally the number stored in the RAM memory section of memory 10' will not be used, but the redial key 7 will be pressed when desired to redial the number stored in the LND memory 5. On those occasions, however, when the user receives a recording indicating that the long distance prefix "1" must be dialed, the user will press the LR redial key 11 instead of the R key 7. The last number dialed stored in the RAM memory of memory 10' will then be read out of that memory to the outpulsing or dialing send circuit 2 through the connection 13' preceded by the long distance prefix "1" from the ROM memory section of memory 10'. Such automatic dialing will result in the number being stored in the LND memory 5 including the prefix "1" so that, if this number is to be dialed again for any reason, it will be dialed the second and subsequent times by pressing the R key 7 instead of the LR key 11. If instead the LR key 11 were pressed the second time, the result would be automatic dialing of two "1's" in sequence which would be inoperative.

In the embodiment shown in FIG. 3, a digit conversion component 20 is connected to a digit selector 21 by connection 22, a digit register 23 in turn is connected to the digit selector by connection 24 and a DTMF (Dual Tone Multifrequency) encoder 25 is connected to the digit register by a connection 26. The ROM memory for the prefix "1" designated 10 in FIG. 1 is indicated as being a "1" register in FIG. 3 which, as discussed in connection with FIG. 1, is connected to a long distance redial button (LR) 11 by a connection 12 and to the digit conversion circuit by the connection 13".

In addition, the LR button is connected by a direct connection 26 to the digit selector 21 and indirectly through a delay circuit 27 by connections 28 and 29 to the digit selector. Provision of the delay circuit 27 will ensure that, on depressing the LR button, automatic dialing of the last previously dialed and recorded telephone number will be delayed sufficiently to enable the prefix "1" to be dialed automatically prior to automatic dialing of the last number dialed.

Discussion of DTMF tone signaling and tone encoder as being conventional occurs in U.S. Pat. No. 4,119,810, at column 1, lines 12 and 26 through 31, column 3, line 49, to column 4, line 7, and column 4, lines 28 through 42.

I claim:

1. In a telephone set including manual dialing means, outpulsing or dialing send circuit means for connection to a telephone line operable by the dialing means, temporary storage memory means connected to the outpulsing and dialing send circuit means for receiving therefrom and storing temporarily the last number dialed and a redial key connected to the temporary storage means and operable to effect transmission therefrom of the last number dialed to the outpulsing or dialing send circuit means for activating the same independently of the manual dialing means, the improvement comprising permanent memory means for storing the long distance prefix numeral "1" connected to the last number dialed storage memory means and to the outpulsing or dialing send circuit means, and a long distance redial key connected to said prefix "1" permanent memory means and operable to effect transmission from the outpulsing or dialing send circuit means of the long distance prefix "1" followed by the last number dialed supplied from the last number dialed temporary storage memory means.

2. In the telephone set defined in claim 1, the temporary storage memory means being in two parts, one part being connected to the redial key and the other part being connected to the permanent memory means and to the long distance redial key.

3. In the telephone set defined in claim 1, a delay connected to the long distance redial key for delaying transmission of the last number dialed in the last number dialed memory until after the long distance prefix "1" has been transmitted.

4. A process for operating an electronic telephone set which comprises temporarily storing in a memory the last number dialed on the telephone, permanently storing a long distance prefix "1", and manually activating a long distance redial key for effecting automatic dialing in sequence first of the permanently stored long distance prefix "1" followed by automatic dialing of the temporarily stored last number dialed on the telephone.

* * * * *